(12) United States Patent
Feng

(10) Patent No.: US 9,864,100 B1
(45) Date of Patent: *Jan. 9, 2018

(54) METAFILM COATING HAVING OMNI-DIRECTIONAL BENDING OF ELECTROMAGNETIC WAVES TO THE NORMAL DIRECTION

(71) Applicant: The United States of America as Represented by the Secretary of the Navy, Washington, DC (US)

(72) Inventor: Simin Feng, Waldorf, MD (US)

(73) Assignee: The United States of America as Represented by the Secretary of the Navy, Washington, DC (US)

(*) Notice: Subject to any disclaimer, the term of this patent is extended or adjusted under 35 U.S.C. 154(b) by 255 days.

This patent is subject to a terminal disclaimer.

(21) Appl. No.: 14/957,893

(22) Filed: Dec. 3, 2015

Related U.S. Application Data

(62) Division of application No. 13/595,136, filed on Aug. 27, 2012, now abandoned.

(60) Provisional application No. 61/562,140, filed on Nov. 21, 2011.

(51) Int. Cl.
| | |
|---|---|
| *G02B 1/11* | (2015.01) |
| *G02B 3/00* | (2006.01) |
| *H02S 40/22* | (2014.01) |
| *G02B 1/00* | (2006.01) |

(52) U.S. Cl.
CPC ............ *G02B 1/002* (2013.01); *G02B 1/11* (2013.01); *G02B 3/00* (2013.01); *H02S 40/22* (2014.12)

(58) Field of Classification Search
None
See application file for complete search history.

(56) References Cited

U.S. PATENT DOCUMENTS

| | | | | |
|---|---|---|---|---|
| 4,267,398 A | * | 5/1981 | Rothwarf | H01L 31/022425 136/256 |
| 8,995,055 B1 | * | 3/2015 | Feng | G02B 5/208 359/360 |
| 2006/0000976 A1 | * | 1/2006 | Brouns | B82Y 20/00 250/353 |

OTHER PUBLICATIONS

Alù et al., Physical Review B 78, 045102 (Jul. 2008).*

* cited by examiner

*Primary Examiner* — Ramsey E Zacharia
(74) *Attorney, Agent, or Firm* — James M. Saunders

(57) ABSTRACT

A metafilm coating having omni-directional bending of electromagnetic waves to the normal direction includes at least one medium having an effective relative permittivity of epsilon-near-zero, $\in$. The real component of the effective relative permittivity along the z-axis, $\Re(\in_z)$, perpendicular to the x-y plane, of the at medium, is about zero. At least one receptor is associated with the medium.

10 Claims, 4 Drawing Sheets

METAFILM COATING HAVING OMNI-DIRECTIONAL BENDING OF ELECTROMAGNETIC WAVES TO THE NORMAL DIRECTION

CROSS-REFERENCE TO RELATED APPLICATIONS

This is a divisional patent application, claiming the benefit of both parent non-provisional patent application Ser. No. 13/595,136 filed on Aug. 27, 2012 and parent provisional patent application No. 61/562,140 filed on Nov. 21, 2011, whereby the entire disclosure of which is incorporated hereby reference.

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The invention generally relates to coatings, and more particularly, to a new way to redirect electromagnetic power coming from all directions to one direction inside an epsilon-near-zero metamaterial.

Figure 1:
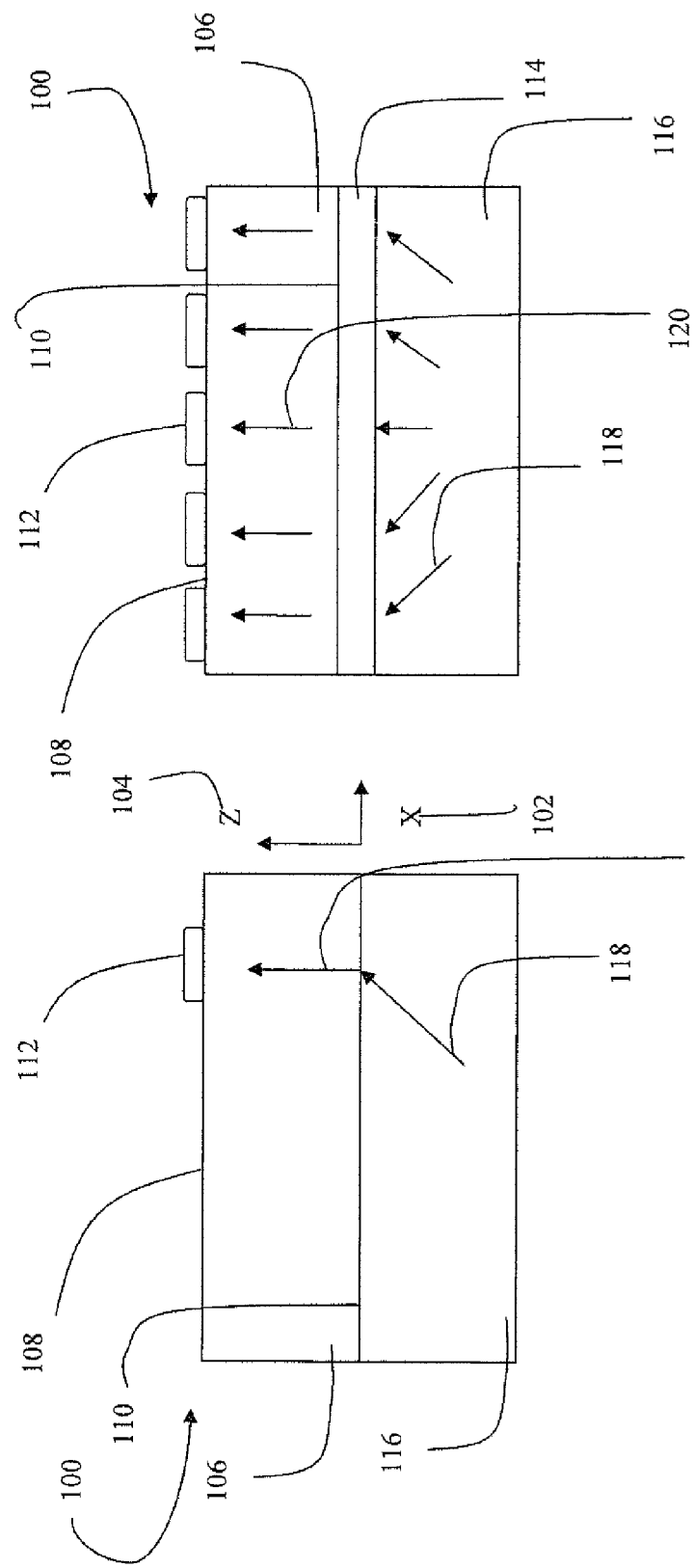
FIG. 1A is a side perspective view of a metafilm coating having omni-directional bending of electromagnetic waves to the normal direction, according to embodiments of the invention.
FIG. 1B is a side perspective view of a metafilm coating (with a primary layer and a secondary layer) having omni-directional bending of electromagnetic waves to the normal direction, according to embodiments of the invention.

It is to be understood that the foregoing general description and the following detailed description are exemplary and explanatory only and are not to be viewed as being restrictive of the invention, as claimed. Further advantages of this invention will be apparent after a review of the following detailed description of the disclosed embodiments, which are illustrated schematically in the accompanying drawings and in the appended claims.

DETAILED DESCRIPTION OF EMBODIMENTS OF THE INVENTION

The invention generally relates to a process to redirect electromagnetic power coming from all directions to one direction inside the epsilon-near-zero metamaterials. Epsilon-near-zero is commonly abbreviated as both ENZ and $\in$.

Embodiments of the invention may be used for detectors, receivers, and sensors in future. As a product of the basic research, the invention provides a new methodology to redirect the electromagnetic (EM) power to one direction inside the epsilon-near-zero metamaterials.

Currently industry is using mirrors or optical lenses to redirect incoming electromagnetic waves. A concept of redirecting the electromagnetic power corning from all directions towards a single direction in epsilon-near-zero metamaterials is provided. This concept is based on the loss induced bending of the electromagnetic power towards the normal direction for all angles of incidence when light passes from an arbitrary refractive index medium to a lossy epsilon-near-zero metamaterial. The proposed concept has potential applications to increase the acceptance angle and to redirect the electromagnetic power without using optical lenses and mechanical gimbals.

Redirecting the EM power coming from any direction to a single direction to the receiver to increase the acceptance angle and power delivery. A dielectric-metal-dielectric film is superimposed on the ENZ medium to increase the transmission magnitude. This sandwich structure possesses coupled plasmonic modes due to closely spaced two dielectric-metal interfaces. By exciting the plasmonic resonance of the structure, the transmission is enhanced. The resonant frequency can be tuned by varying the thickness of the layers. In modeling simulation, the materials of the dielectric and metallic layers are, respectively, amorphous polycarbonate (APC) and silver. The loss of the APC is very small in the simulation wavelength range and thus it is neglected. The absorption of silver is included in the simulation. A plane wave is incident from air to the film. About 90 percent transmissions are achieved for a wide range of the angle of incidence up to 70 degrees at wavelengths of wavelength 0.80 and 0.59 micrometers.

Although embodiments of the invention are described in considerable detail, including references to certain versions thereof other versions are possible. Examples of other versions include orienting the layers in different fashion. Therefore, the spirit and scope of the appended claims should not be limited to the description of versions included herein.

In the accompanying drawings, like reference numbers indicate like elements. FIGS. 1A and 1B illustrates a perspective view of a metafilm coating having omni-directional bending of electromagnetic waves to the normal direction, according to embodiments of the invention. Specifically, FIG. 1A is a side perspective view of a metafilm coating having omni-directional bending of electromagnetic waves to the normal direction, according to embodiments of the invention. FIG. 1B is a side perspective view of a metafilm coating (with a primary layer and a secondary layer) having omni-directional bending of electromagnetic waves to the normal direction, according to embodiments of the invention. Reference character 100 depicts an apparatus of embodiments of the invention. The apparatus 100, a metafilm coating may also be referred to with other descriptions including, but not limited to, a coating and a thin film coating, without detracting from the merits or generality of embodiments of the invention. The apparatus 100 is viewed relative to the x-axis 102, and z-axis 104.

Embodiments of the invention generally relate to a metafilm coating, including at least one medium 106 having an effective relative permittivity of epsilon-near-zero, $\in$. The medium 106 has a first side 108 and a second side 110. The real component of the effective relative permittivity along the z-axis 104, $\mathcal{R}(\in_z)$, perpendicular to the x-y plane, of the medium 106, is about zero.

The dissipation of the effective relative permittivity along the z-axis 104, $\Im(\epsilon_z)$, perpendicular to the x-y plane, of the medium 106 is at least 10 times greater than the real component of permittivity along the z-axis 104, $\Re(\epsilon_z)$, when $\Re(\epsilon_z) \ll \Im(\epsilon_z)$. At least one receptor 112 associated with the medium 106.

Another embodiment of the invention is depicted in FIG. 1B and generally relates to a metafilm coating, including at least one primary layer 106 having an effective relative permittivity of epsilon-near-zero, e. The primary layer has a first side 108 and a second side 110. The absolute value of the effective relative permittivity parallel to the x-y plane, sp, of the primary layer 106, is about zero, where $|\epsilon_p| \to 0$. A person having ordinary skill in the art will recognize that this means that the absolute value of c, is approaching zero. At least one receptor 112 is associated with the primary layer 106. At least one secondary layer 114 is associated with the primary layer 106. The secondary layer 114 is an antireflection nanoplasmonic thin film coating superimposed on the second side 110 of the primary layer 106.

Another embodiment of the invention generally relates to a metafilm coating, including at least one primary layer 106 having a first side 108 and a second side 110. The primary layer 106 has an effective relative permittivity of epsilon-near-zero, e. At least one secondary layer 114 is superimposed on the second side 110 of the primary layer 106. The real component of the effective relative permittivity along the z-axis 104, $\Re(\epsilon_z)$, perpendicular to the x-y plane, of the primary layer 106, is about zero. The dissipation of the effective relative permittivity along the z-axis 104, $\Im(\epsilon_z)$, perpendicular to the x-y plane, of the primary layer 106 is at least 10 times greater than the real component of permittivity along the z-axis, $\Re(\epsilon_z)$, where $\Re(\epsilon_z) \ll \Im(\epsilon_z)$.

At least one receptor 112 is associated with the primary layer 106. Silicon-carbide (Si—C) may be used for the primary layer 106. The secondary layer 114 is an antireflection nanoplasmonic thin film coating selected from the group of materials consisting of amorphous polycarbonate and silver. The dissipation of the effective relative permittivity parallel to the x-y plane, $\Im(\epsilon_p)$, is about 0. Stated another way, $\Im(\epsilon_p)$ approaches zero ($\Im(\epsilon_p) \to 0$).

In embodiments, the medium 106 in FIG. 1A may also be referred to as an ENZ medium, ENZ material, or as the primary layer (as referred to for embodiments in FIG. 1B) without detracting from the merits or generality of embodiments of the invention. In embodiments, the medium 106 may be natural materials or engineered materials. Examples of natural materials include, but are not limited to, glass, silicon-carbide (Si—C), diamond, silicon, and silica. Engineered material examples include composites and metamaterials. Appropriate examples of suitable engineered materials for the medium/primary layer 106 include composites and metamaterials such as, for example, photonical crystal metamaterials.

The secondary layer 114 (FIG. 1B) may also be referred to as a matching layer. The secondary layer 114 is used to maximize energy transfer by being oriented so that it is facing incoming electromagnetic waves 118 to enhance the magnitude of the energy transmission. The incoming electromagnetic waves 118 then bend normal (shown as reference character 120) to the secondary layer 114 and transmit through the primary layer 106. Incoming electromagnetic waves 118 bend in the embodiment depicted in FIG. 1A without the secondary layer 114 (FIG. 1B). However, enhanced (greater magnitude) energy transfer occurs by utilizing the secondary layer 114. The secondary layer 114 (FIG. 1B) may be a dielectric such as, for example, amorphous polycarbonate or a metal (or metal alloy) such as, for example, silver. The secondary layer 114 (FIG. 1B) can also be engineered materials.

The receptor 112 is bonded to the first side 108 of the medium 106. In other embodiments, the receptor 112 is embedded in the medium 106. The receptor 112 is selected from the group of materials consisting of infrared sensors, optical sensors, terahertz (THz) sensors, microwave and radio frequency sensors, photocells, photodiodes, and lenses.

In embodiments, the apparatus 100 is modeled as having an air substrate 116, sometimes referred to as free space. Other substrate materials such as, for example, water or oil, may also be used depending on application specific-conditions. The association between the primary layer 106 and the secondary layer 114 is by bonding. Examples of bonding include, but are not limited to, mechanical bonding, chemical bonding, van der Waals bonding, dipole interaction, and ionic bonding.

Although depicted as a single layer in FIGS. 1A and 1B, the medium/primary layer 106 and the secondary layer 114 (FIG. 1B) may include additional layers. Furthermore, numerous descriptions of the layers are also possible without detracting from the merits or generality of embodiments of the invention, given that the overall effective permittivity of layers composing the primary layer 106 satisfies the conditions: $\Re(\epsilon_z) \to 0$ and $\Re(\epsilon_z) \ll \Im(\epsilon_z)$. This means that when the primary layer 106 is composed of more than one layer, the permittivity is the overall effective permittivity of the primary layer. Likewise, when the secondary layer 114 is composed of more than one layer, the secondary layer is located adjacent to (bonded to) the primary layer 106, and the overall structure of the secondary layer is an antireflection film.

Numerous orientations of the apparatus 100 and respective layers (106 and 114) are possible dependent on application specific conditions. Layer thicknesses are based on application-specific conditions and are affected by material EM wavelengths. In embodiments having both primary 106 and secondary 114 layers, the second side 110 of the primary layer may also be referred to as an interface between the primary and secondary layers without detracting from the merits or generality of embodiments of the invention.

Significant modeling of embodiments of the invention suggest that the direction of the EM power bends towards the surface normal when light is incident from an arbitrary refractive index medium to a lossy $\epsilon$-near-zero metamaterial (depicted in FIG. 1A). The direction of the transmission is close to the normal direction for all angles of incidence (AOI).

As shown in FIG. 1B, EM power is redirected from all directions to a specified single direction, where the incoming waves 118 from all directions can propagate in the normal direction after entering the ENZ material 106. The nanoplasmonic thin film coating 114 is placed in front of the ENZ medium 106 to enhance the transmission through structural resonances. For light coming from all directions including grazing angles, the transmitted powers all point to the receptors 112 embedded at the back of the ENZ medium 106, which effectively increases the acceptance angle and the energy delivery.

Embodiments of the invention apply equally to both anisotropic media and isotropic ENZ media 106. Analytical results shown below is directed to anisotropic media. In the principal coordinate, for each macroscopically uniform layer, the permittivity and permeability tensors can be described by diagonal matrices. Assuming a harmonic time dependence, exp(−iωt), for the EM field and starting from Maxwell's equations and considering transverse magnetic (TM) modes that have non-zero components $H_y$, $E_x$, and $E_z$, the magnetic field $H_y$ satisfies following wave equation:

$$\frac{1}{\epsilon_z}\frac{\partial^2 H_y}{\partial x^2} + \frac{1}{\epsilon_x}\frac{\partial^2 H_y}{\partial z^2} + k_0^2 \mu_y H_y = 0, \quad (1)$$

which permits the solution of form $\psi(z)\exp(i\beta x)$. Here the transverse wave number $\beta$ is determined by incidence wave and is conserved across the interface of different regions through:

$$\beta^2 = k_0^2 \epsilon_{nz}\mu_{ny} - \alpha_n^2 \frac{\epsilon_{nz}}{\epsilon_{nx}}, (n = 1, 2, \ldots), \quad (2)$$

In Eq. 2, $k_0 = \omega/c$ and $\alpha_n$ represent the wave number in the z direction. The functional form of $\psi(z)$ is either a simple exponential $\exp(i\alpha_n z)$ for the semi-infinite region or a superposition of $\cos(\alpha_n z)$ and $\sin(\alpha_n z)$ for the bounded region along the z direction. The other two components $E_x$ and $E_z$ can be solved from the Maxwell's equations. By matching the boundary conditions at the interfaces, the electromagnetic field can be calculated in each region. Thus, the Poynting vector (S) can be computed. In an anisotropic medium, the direction of the Poynting vector is often different from that of the phase front of the field. The analysis below considers the direction of the Poynting vector since it is related to the direction of the energy transport. The angle ($\theta_S$) of the Poynting vector which is measured from the surface normal can be numerically computed from $\theta_S = \tan^{-1}(S_x/S_z)$. The assumption is made that $\mu=1$ for all the materials described below. In FIGS. 1A and 1B, the input medium 116 is isotropic with permittivity $\epsilon_1$. The output medium 106 is the ENZ material ($\epsilon_2 \approx 0$). Both anisotropic ($\epsilon_{2x} \neq \epsilon_{2z}$) and isotropic ($\epsilon_{2x} = \epsilon_{2z}$) ENZ materials were considered in analysis.

Figure 2:
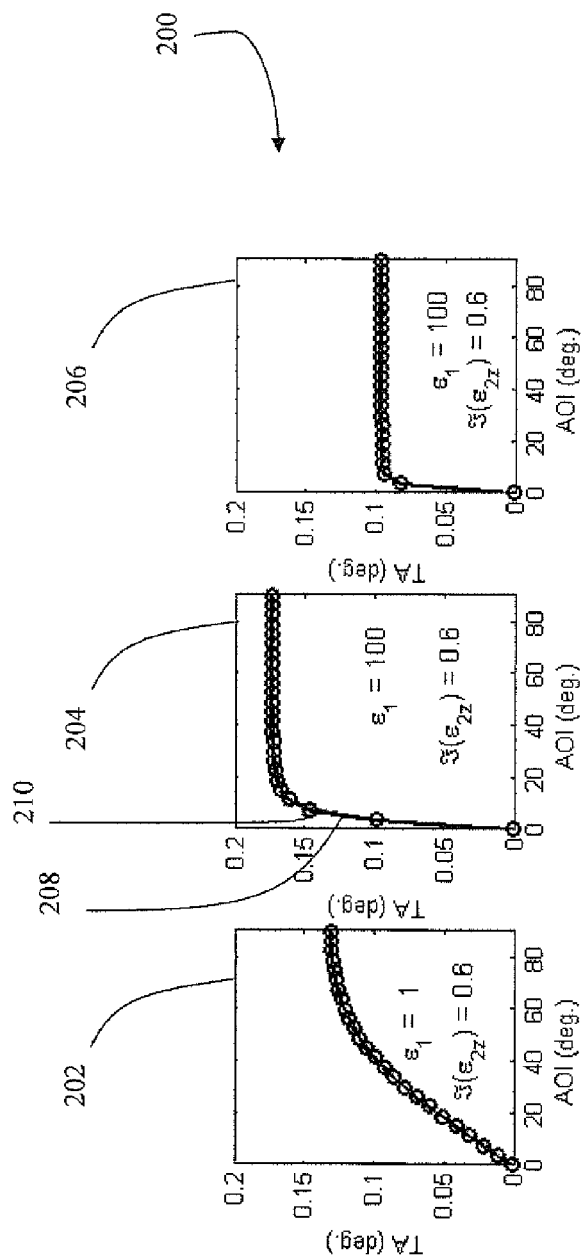
FIG. 2 is a graphical comparison of transmission angle (TA) of Poynting vector versus angle of incidence (AOI), according to embodiments of the invention.

FIG. 2 is a graphical comparison of transmission angle (TA) of Poynting vector versus angle of incidence (AOI), according to embodiments of the invention, and depicted as reference character 200. The comparison is conducted for the different permittivity ($\epsilon_1$) of the input medium (116 in FIGS. 1A and 1B) and for the anisotropic and isotropic ENZ layer 106. The left (reference character 202) and middle (reference character 204) panels use an anisotropic ENZ material with $\epsilon_{2x}=1$ and $\epsilon_{2z}=0.001+i0.6$. The right panel (reference character 206) uses an isotropic ENZ material with $\epsilon_{2x}=\epsilon_{2z}=0.001+i0.6$. As depicted in FIG. 2, the transmission angle is less than one degree and close to zero (normal direction) for all angles of incidence. In the left panel 202, $\epsilon_1=1$. For both the middle and right panels 204 and 206, $\epsilon_1=100$. A person having ordinary skill in the art will recognize that the normal direction as used in embodiments of the invention is perpendicular to the interface 110.

In the middle and right panels 204 and 206, even with the permittivity of the input medium much higher than that of the output medium, light still bends to the normal, leading to omni-directional collimated transmission with little spread in the normal direction. The left 202, middle 204, and right 206 panels depict both numerical and analytical computation. For instance, in the middle panel 204, a curve 208 is obtained from the numerical computation. The circles 210 in the middle panel 204 are calculated from the analytical formula Eq. (4), showing a good agreement between the numerical and analytical results. Curves and circles in the left and right panels 202 and 206 are similarly calculated. Material loss switches the TA from a grazing angle of approximately 90 degrees (not shown in FIG. 2) to near zero shown for all AOI in the left, middle, and right panels 202, 204, and 206.

The transmission angle ($\theta_S$) of the Poynting vector is analyzed to understand this loss-induced switching phenomenon. The transmission angle ($\theta_S$) is given by:

$$\tan(\theta_S) = \frac{S_x}{S_z} = \frac{\Re\left(\frac{\bar{\beta}}{\epsilon_z}\right)}{\Re\left(\sqrt{\frac{\mu_y}{\epsilon_x} - \frac{\bar{\beta}^2}{\epsilon_x \epsilon_z}}\right)}, \quad (3)$$

where $\bar{\beta}=\beta/k_0$ and is determined by incidence angle. Unlike the magnitude of the Poynting vector, the angle of the Poynting vector is independent of the middle layers and only depends on the input and output media due to the conservation of the parallel wave-vector. Assuming $\mu_y$ is real, after tedious derivation, the transmission angle becomes $$\tan(\theta_S) = \frac{|\epsilon_x|\epsilon_z^r}{a|\epsilon_z|}, \quad (4)$$

where $\epsilon_z^r \equiv \Re(\epsilon_z)$ is the real part of $\epsilon_z$, and $$a^2 = \frac{1}{2}(A\epsilon_x^r + B|\epsilon_x| - \epsilon_x^r \epsilon_z^r + \epsilon_x^i \epsilon_z^i), \quad (5)$$

where $\epsilon_z^i \equiv \Im(\epsilon_z)$, $\epsilon_x^r \equiv \Re(\epsilon_x)$, $\epsilon_x^i \equiv \Im(\epsilon_x)$, and $$A \equiv \frac{|\epsilon_z|^2 \mu_y}{\bar{\beta}^2}, B = \sqrt{|\epsilon_z|^2 - 2A\epsilon_z^r + A^2}. \quad (6)$$

The loss-induced omni-directional bending to the normal observed in FIG. 2 can be explained from Eq. (4). When $\epsilon_z^i=0$, when $\epsilon_z^r \to 0$, $\epsilon_z^r/|\epsilon_z| \to 1$ and $a \to 0$, thus $\theta_S \to 90°$. When $\epsilon_z^i \neq 0$, when $\epsilon_z^r \to 0$, $\epsilon_z^r/|\epsilon_z| \to 0$, and a is finite, therefore, $\theta_S \to 0°$. To validate Eq. (4), in FIG. 2 the transmission angle calculated from Eq. (4) (circles 210) is compared to the numerical result (curve 208), showing a good agreement between the analytical formula Eq. (4) and the numerical computation.

Figure 3:
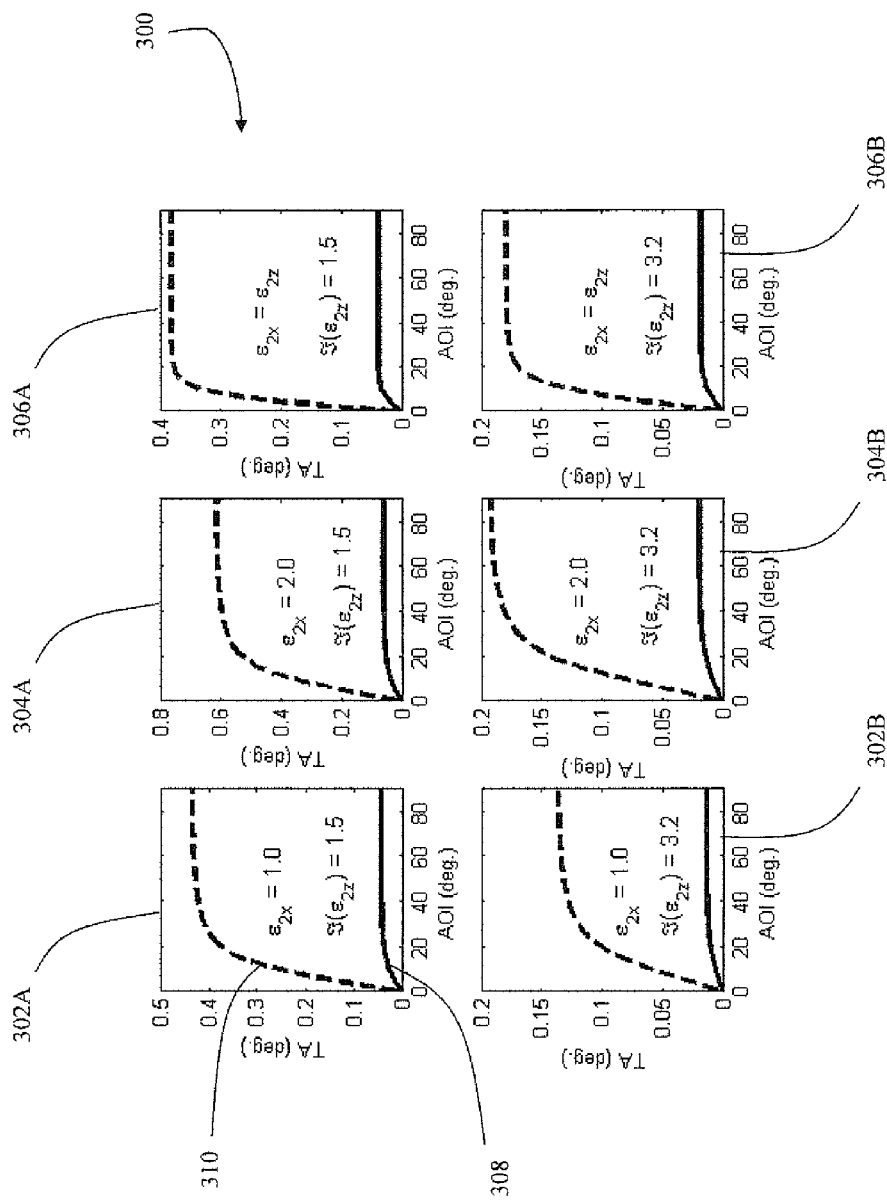
FIG. 3 is a graphical comparison of TA versus AOI when $\mathcal{R}(\in_{zz})=0.001$ (solid curve) and $\mathcal{R}(\in_{zz})=0.01$ (dashed curve), according to embodiments of the invention.

FIG. 3 is a graphical comparison of TA versus AOI for when $\Re(\epsilon_{2z})=0.001$ (solid curve 308) and $\Re(\epsilon_{2z})=0.01$ (dashed curve 310), according to embodiments of the invention, and depicted as reference character 300. To demonstrate the loss-induced omni-directional bending to the normal phenomenon is a robust feature, FIG. 3 shows the transmission angle versus AOI for different real parts of $\epsilon_z$ and $\epsilon_x$, as well as for different material loss values.

Curves 308 and 310 are typical for all panels depicted in FIG. 3. In the top panels 302A, 304A, and 306A, $\Im(\epsilon_{2z})=1.5$. In the bottom panels 302B, 304B, and 306B, $\Im(\epsilon_{2z})=3.2$. The left and middle panels 302A/B and 304A/B are for the anisotropic material with $\epsilon_{2x}=1.0$ (left panels 302A/B) and with $\epsilon_{2x}=2.0$ (middle panels 304A/B). Right panels (306A and 306B) are for the isotropic material $\in_{2x}=\in_{2z}$. The permittivity of the input medium is $\in_1=36$.

The closer to zero the $\Re(\in_z)$ and the bigger the loss $\Im(\in_z)$ are, the smaller the transmission angle is. When $\Re(\in_z) \to 0$, the angular spread of the transmission can be estimated from $$\Delta\theta_S \approx \begin{cases} \dfrac{\sqrt{2}\,|\epsilon_x||\epsilon_z^r|}{|\epsilon_z|^{3/2}\sqrt{|\epsilon_x|+\epsilon_x^i+\rho\epsilon_x^r}} & \text{when } \rho \leq 1 \\ \dfrac{\sqrt{2}\,|\epsilon_x||\epsilon_z^r|}{|\epsilon_z|^{3/2}\sqrt{\epsilon_x^i+\rho(|\epsilon_x|+\epsilon_x^r)}} & \text{when } \rho \geq 1 \end{cases}, \quad (7)$$

$$\text{In Eq. 7, } \rho \equiv \frac{|\epsilon_z|\mu_y}{\epsilon_1 \mu_1}. \quad (8)$$

Figure 4:
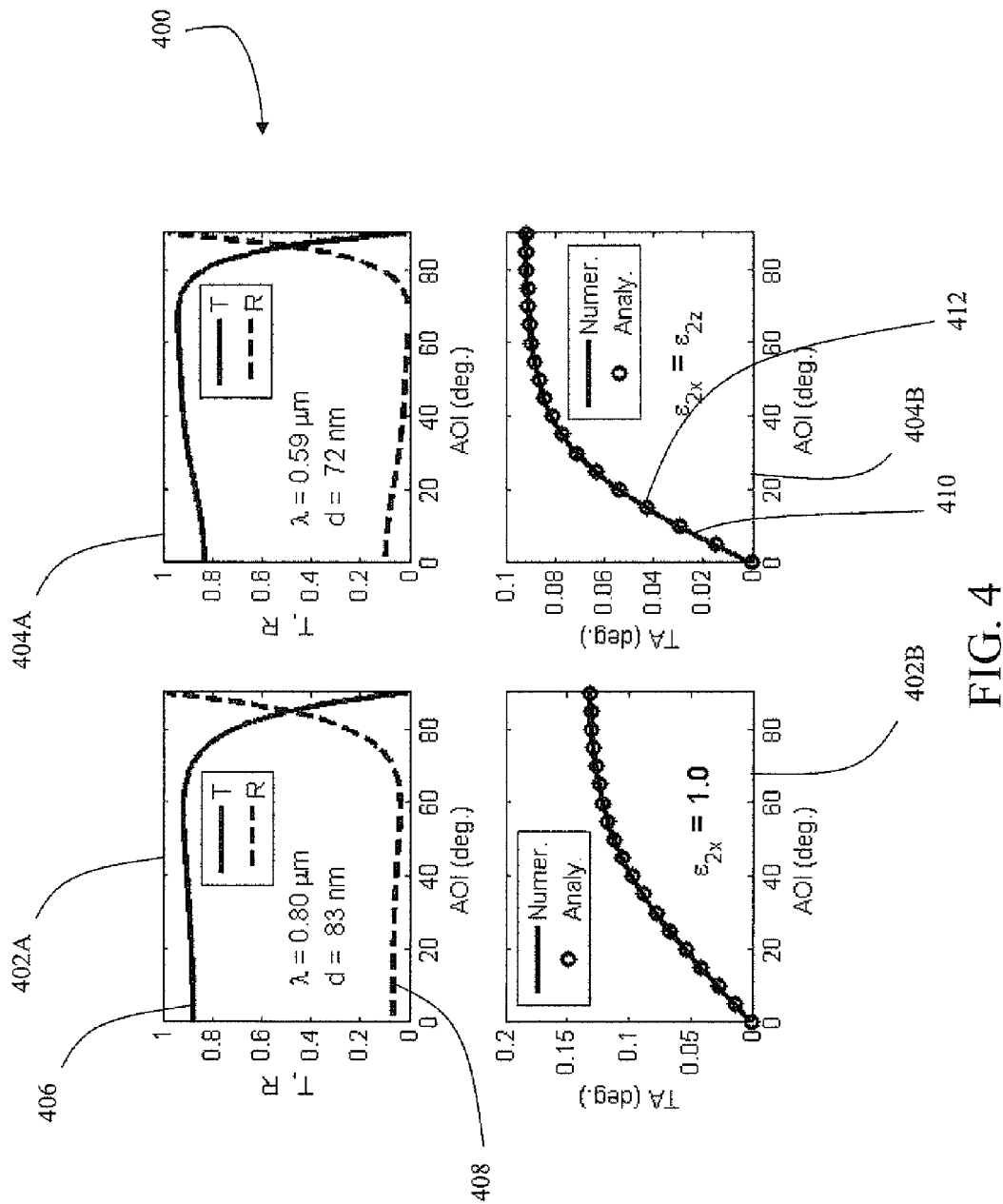
FIG. 4 is a graphical comparison of transmittance (T) and reflectance (R) versus AOI in the top panels and the corresponding TA versus AOI in the bottom panels, according to embodiments of the invention.

FIG. 4 is a graphical comparison of transmittance (T) and reflectance (R) versus AOI in the top panels (reference characters 402A and 404A) and the corresponding TA versus AOI in the bottom panels (reference characters 402B and 404B, according to embodiments of the invention, and depicted as reference character 400.

In the top panels 402A and 404A, transmittance (depicted as solid curve 406 which is typical for both panels 402A and 404A) and reflectance (depicted as dashed curve 408 which is typical for both panels 402A and 404A) versus AOI when the back of the nanoplasmonic film (secondary layer 114 in FIG. 1B) is superimposed on an anisotropic ENZ medium (106 in FIG. 1A/B) with $\in_{2x}=1.0$ (left panels 402A/B) and the isotropic ENZ medium (right panels 404A/B). For both left and right panels 402A/B and 404A/B, $\in_{2z}=0.001+i0.6$.

Bottom panels 402B and 404B depict corresponding transmission angle (TA) versus AOI. Solid curves 410 (typical for both panels 402B and 404B) represent the numerical result using a scattering matrix method. Circles 412 (typical for both panels 402B and 404B) are calculated from the analytical formula Eq. (4). Amorphous polycarbonate (APC) and silver (Ag) are modeled for the nanoplasmonic film/secondary layer 114 (FIG. 1B). The thickness of the APC is d=83 nm (left panels 402A/B) and d=72 nm (right panels 404A/B). The thickness of Ag is 10 nm for both cases. The wavelength of the resonant transmission occurs at the $\lambda=0.8$ μm (left panels 402A/B) and the $\lambda=0.59$ μm (right panels 404A/B).

Simulation results of embodiments of the invention demonstrate omni-directionally rerouting the EM power towards one direction in the ENZ medium. The operation principles of the methodology are based on two mechanisms. One is the loss-induced bending of the EM power towards the normal direction for all angles of incidence when light passes from an arbitrary refractive index medium to a lossy ENZ medium. The other is the enhanced transmission through structural resonances. The first mechanism is responsible for omni-directionally bending the direction of the power while the second mechanism is for increasing the magnitude of the transmitted power. The proposed methodology may have applications in communications, detectors, receivers, sensors, and solar cells to increase the acceptance angle and to redirect the EM power without using optical lens and mechanical gimbals.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. An electromagnetic wave bending metafilm coating, consisting of:
    a single primary layer having an effective relative permittivity of epsilon-near-zero, $\in$, wherein said single primary layer has a first side and a second side, wherein said single primary layer is silicon-carbide;
    wherein the absolute value of said effective relative permittivity parallel to the x-y plane, $\in_p$, of said single primary layer, is about zero, wherein $|\in_p| \to 0$;
    at least one receptor associated with said single primary layer; and
    a single secondary layer in layered contact with and overlying an input medium, wherein said single secondary layer is an anti-reflection film coating superimposed on said second side of said single primary layer;
    wherein said single secondary layer is selected from the group of materials consisting of amorphous polycarbonate and silver;
    wherein said single secondary layer bends incoming electromagnetic waves normal to said single primary layer and toward said at least one receptor.

2. The electromagnetic wave bending metafilm coating according to claim 1, wherein said at least one receptor is bonded to said first side of said single primary layer.

3. The electromagnetic wave bending metafilm coating according to claim 1, wherein said at least one receptor is selected from the group of materials consisting of infrared sensors, optical sensors, terahertz sensors, microwave and radio frequency sensors, photocells, photodiodes, and lenses.

4. The electromagnetic wave bending metafilm coating according to claim 1, wherein said at least one receptor is one receptor.

5. The electromagnetic wave bending metafilm coating according to claim 1, wherein said at least one receptor is five receptors.

6. The electromagnetic wave bending metafilm coating according to claim 1, wherein said at least one receptor is a range of one to five receptors.

7. The electromagnetic wave bending metafilm coating according to claim 1, wherein said single secondary layer is 10 nanometers thick silver.

8. The electromagnetic wave bending metafilm coating according to claim 1, wherein said single secondary layer is a thickness range of 72 nanometers to 83 nanometers thick amorphous polycarbonate.

9. The electromagnetic wave bending metafilm coating according to claim 1, wherein said input medium is selected from the group of input mediums consisting of air, water, and oil.

10. The electromagnetic wave bending metafilm coating according to claim 1, wherein said electromagnetic wave bending metafilm coating bends incoming omni-directional electromagnetic waves to the normal direction without using optical lenses.

* * * * *